United States Patent [19]

Wozniak et al.

[11] 4,300,425
[45] Nov. 17, 1981

[54] FLOOR OR BENCH MOUNTED CONDUIT CUTTING DEVICE

[75] Inventors: Glenn A. Wozniak, Chagrin Falls; Robert R. Rady, Strongsville; Harold T. Pate, Solon, all of Ohio

[73] Assignee: Indian Head Inc., New York, N.Y.

[21] Appl. No.: 16,507

[22] Filed: Mar. 1, 1979

[51] Int. Cl.³ .............................................. B23D 17/08
[52] U.S. Cl. ..................................... 83/468; 83/603; 83/607
[58] Field of Search ................. 83/603, 601, 604–609, 83/584, 468

[56] References Cited

U.S. PATENT DOCUMENTS

| | | | |
|---|---|---|---|
| 848,552 | 3/1907 | House | 83/603 X |
| 1,814,790 | 7/1931 | Edwards | 83/603 |
| 2,263,466 | 11/1941 | McCarthy | 83/607 X |
| 2,353,922 | 7/1944 | Neal | 83/603 |
| 2,465,392 | 3/1949 | Nickell | 83/605 X |
| 2,526,263 | 10/1950 | Neal | 83/603 |
| 2,712,851 | 7/1955 | Carter et al. | 83/605 X |

FOREIGN PATENT DOCUMENTS 837680  5/1952  Fed. Rep. of Germany ........ 83/606

*Primary Examiner*—J. M. Meister
*Attorney, Agent, or Firm*—Laney, Dougherty, Hessin and Beavers

[57] ABSTRACT

Apparatus for cutting a conduit or tubular element transversely to the longitudinal axis thereof which includes a base having a housing projecting vertically therefrom. The housing includes opposed, substantially parallel side plates separated by a vertical slot at their upper ends, and by a mechanism chamber at their lower ends. A blade element is pivotally supported between the parallel side plates, and carries a plurality of ratchet teeth along the lower peripheral edge, and a cutting edge disposed at the opposite side of the blade element from the ratchet teeth. Between the teeth and cutting edge, the knife element has an elongated, arcuate slot formed therethrough. An operating handle is pivotally connected to the housing at a side thereof spaced from the pivotal axis of the blade element. A pawl lever is pivotally connected to the operating handle and has a dog thereon positioned to ride over and operatively engage the ratchet teeth as the operating handle is pivoted. An elongated indexing link is pivotally connected at one end to the pawl lever and carries a stud at its other end which rides in the arcuate slot in the blade element. A conduit supporting jaw is mounted at the upper side of the housing, and defines an arcuate recess dimensioned to support a conduit to be cut by the apparatus.

25 Claims, 17 Drawing Figures

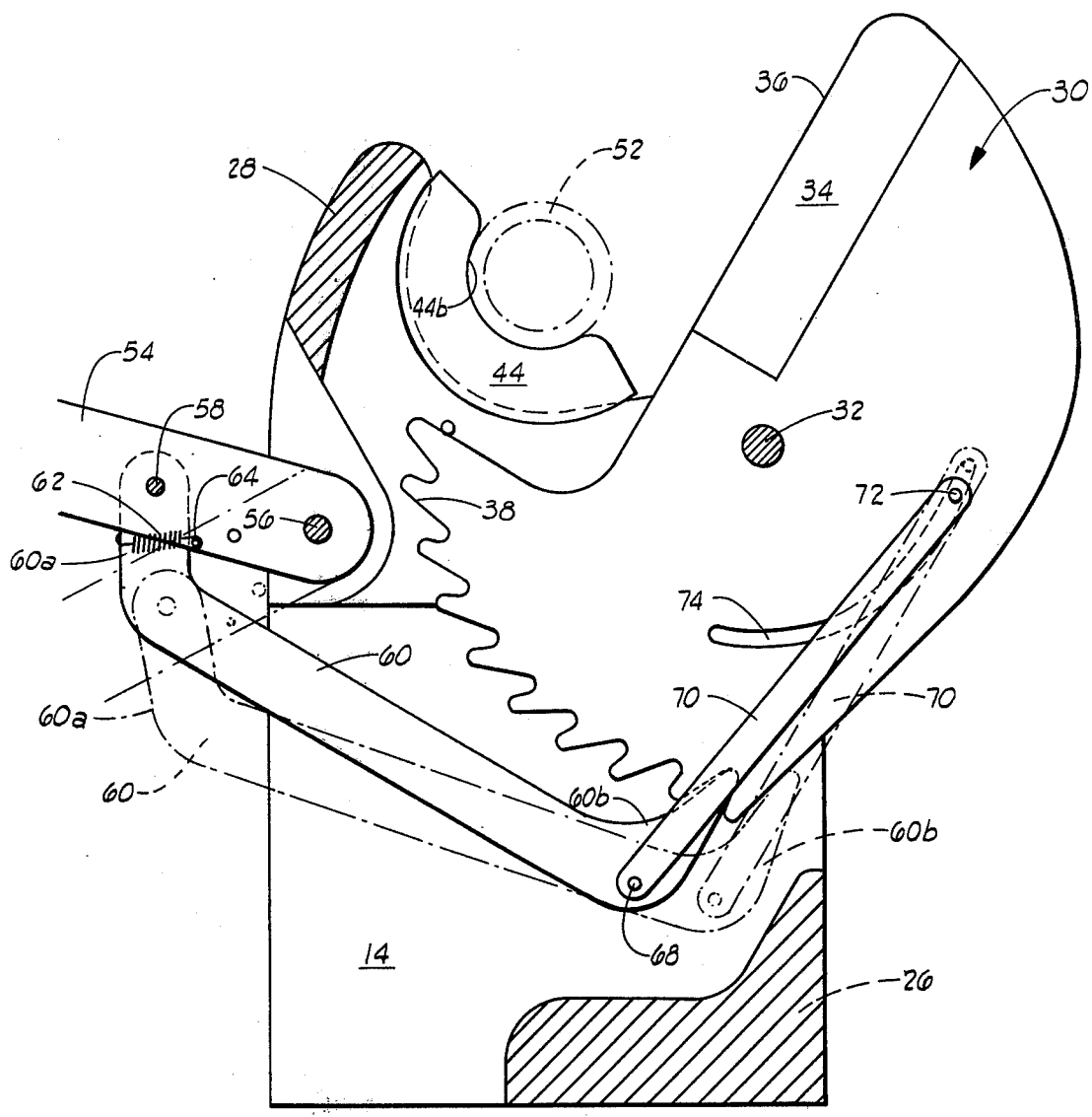
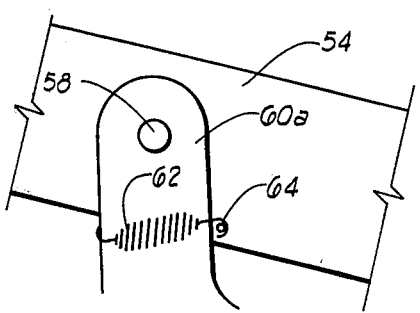
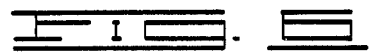

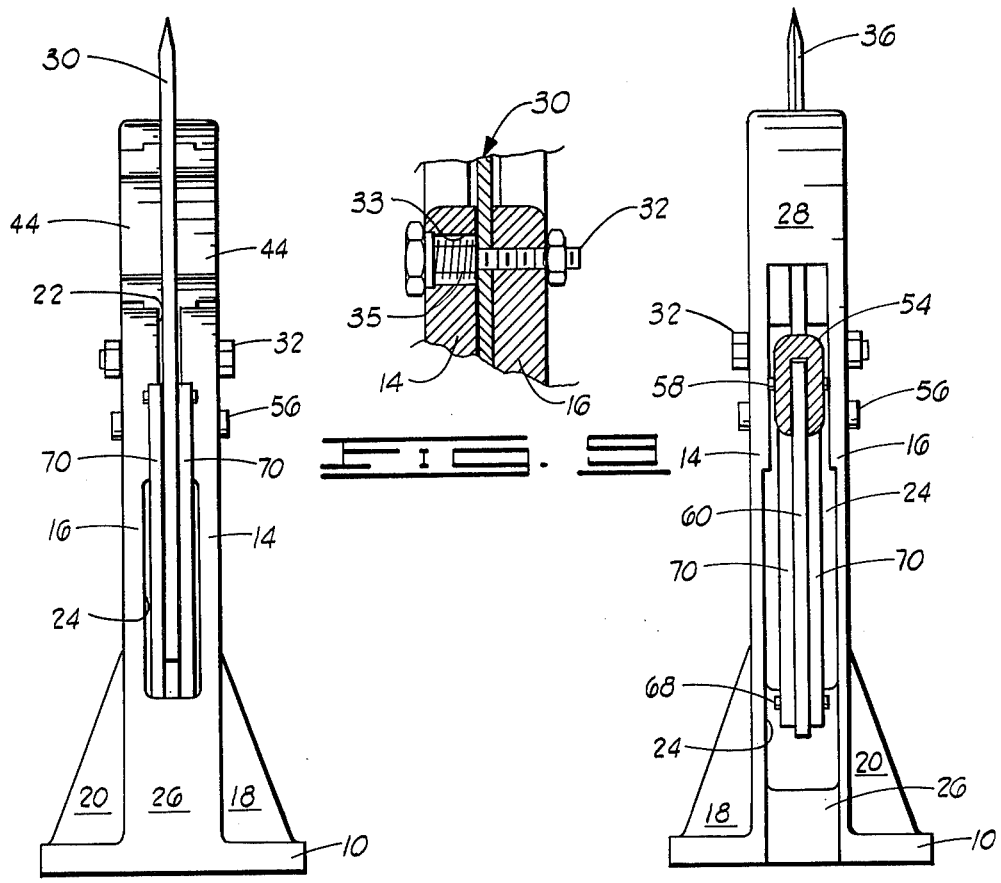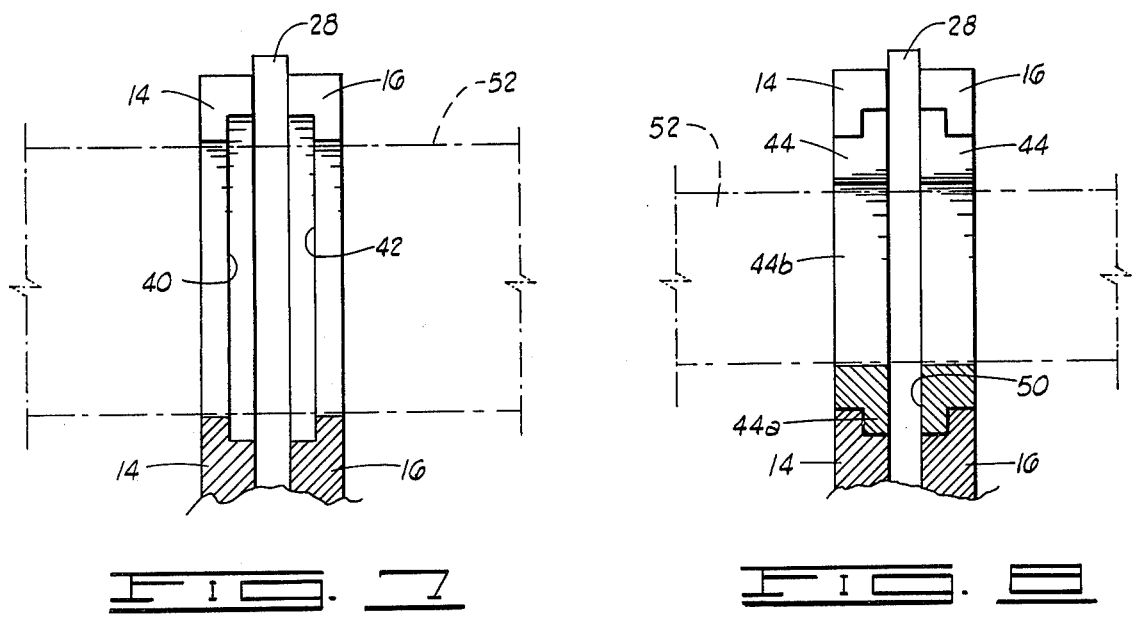

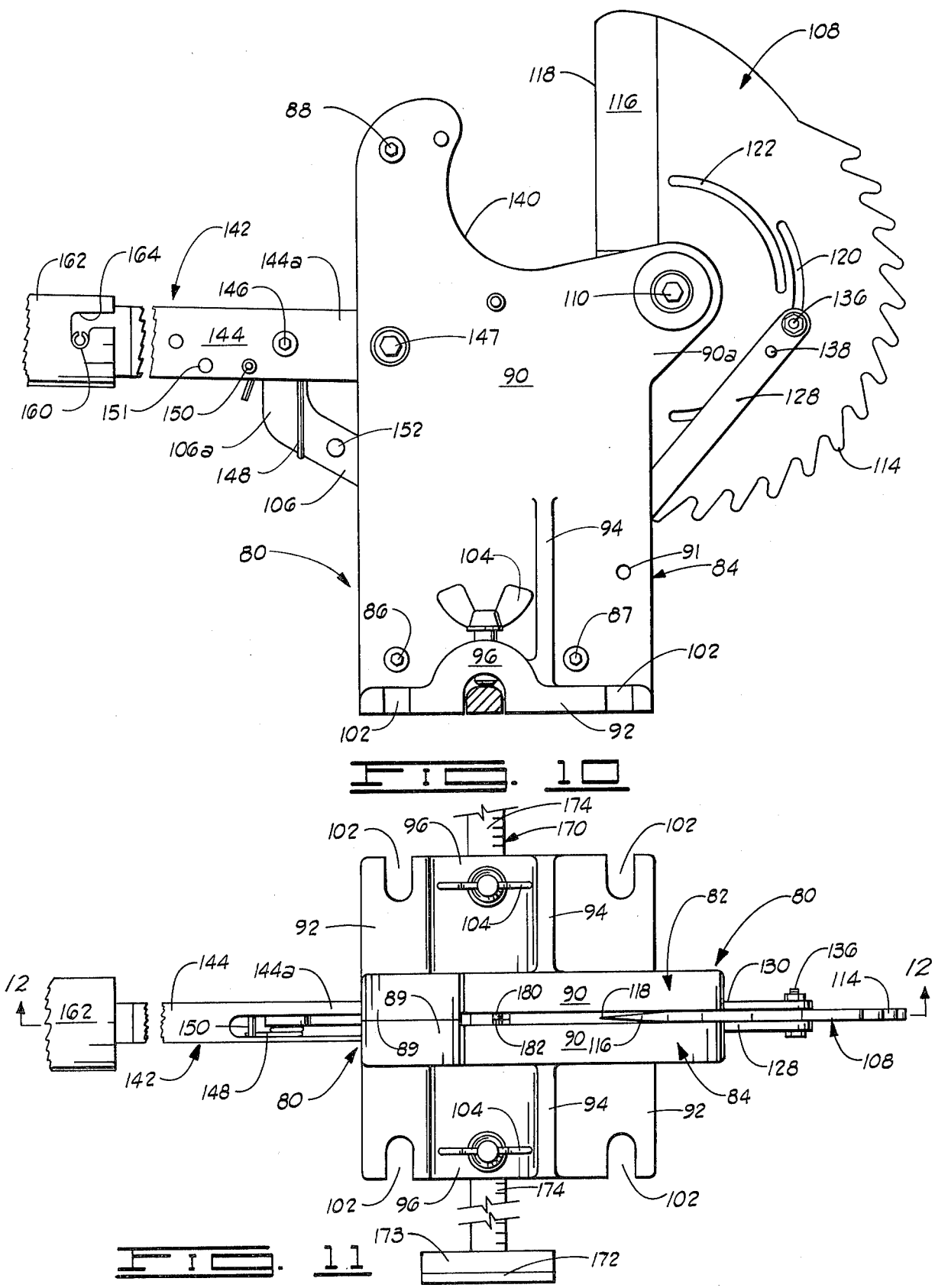

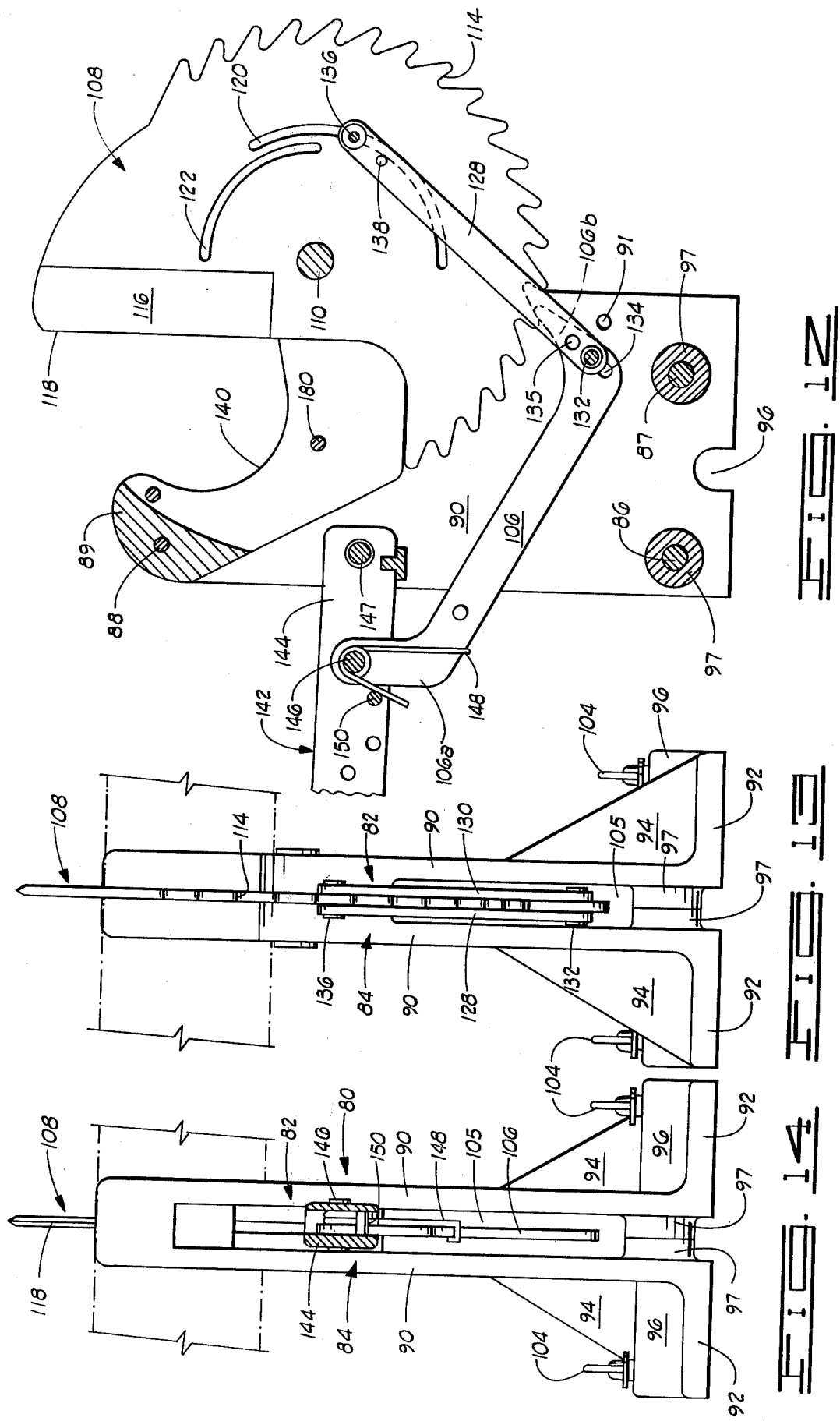

FLOOR OR BENCH MOUNTED CONDUIT CUTTING DEVICE

BACKGROUND OF THE INVENTION

1. Field of the Invention

This invention relates to devices for transversely cutting through rigid and semi-rigid tubular members, such as synthetic resin conduit, and more particularly relates to apparatus which can be operated by hand, to shear through a tubular element along a plane extending normal to the longitudinal axis of the tubular element.

2. Description of the Prior Art

In Nakamura et al. U.S. Pat. No. 4,084,317, a shearing tool for cutting through synthetic resin tubes is disclosed. The Nakamura shearing tool includes a pair of movable handle elements, one of which carries a fixed jaw which moves with the handle, and the other of which is pivotally connected to the first handle adjacent the jaw. The second of the handles, which does not carry a fixed jaw, has a serrated lever connected thereto which acts through a pivoted linkage to cause the fixed jaw to pivot through an increment of pivotal movement each time the second handle element is pivoted relative to the first handle element.

Devices which can be used for cutting through structures such as synthetic resin tubular elements are also shown in Florian U.S. Pat. Nos. 3,390,455 and 3,273,240. Both of these structures include elongated handle elements, one of which carries a fixed jaw, and the other of which pivots on the first handle element at a location adjacent the fixed jaw and actuates a second jaw pivotally mounted on the first-mentioned handle element through an interconnecting linkage which includes ratchet teeth and a lever carrying a pin which acts upon the teeth of the ratchet as the handles are pivoted toward and away from each other.

BRIEF DESCRIPTION OF THE PRESENT INVENTION

The present invention is an apparatus suitable for mounting on a floor, bench or other supporting platform, and for cutting through a conduit or tubular element in a direction transverse with respect to the longitudinal axis of the conduit or tubular element. The apparatus includes a base for supporting the remaining portion of the structure on the floor, bench or other supporting platform, and a housing mounted over and secured to this base for supporting the cutting mechanism and the conduit to be cut.

The housing includes opposed, substantially parallel side plates which are separated by a vertical slot located between the upper end portions of the two side plates, and by a mechanism chamber located below the slot and between the lower end portions of the two side plates. A blade element is pivotally supported between the parallel side plates, and carries a plurality of ratchet teeth along its lower peripheral edge. A cutting edge is formed on one side of the blade element opposite the ratchet teeth. Between the teeth and the cutting edge, the knife element has an elongated, arcuate slot formed therethrough.

An operating handle is pivotally connected to the housing at a side thereof spaced from the pivotal axis of the blade element, and certain operating mechanism interconnects the operating handle with the blade element to cause pivotation of the blade element about its pivotal axis. The operating mechanism includes a pawl lever which is pivotally connected to the operating handle, and which has a dog on one end thereof to ride over, and operatively engage, the blade element ratchet teeth as the operating handle is pivoted. An elongated indexing link is pivotally connected at one end to the pawl lever and carries a stud at its other end which extends into and rides in the arcuate slot in the blade element. A conduit supporting jaw is mounted at the upper side of the housing and defines an arcuate recess dimensioned to support a conduit to be cut by the apparatus as the blade element undergoes pivotal movement when the operating handle is actuated.

An important object of the present invention is to provide a mechanically sturdy, reliable conduit cutting device which can be used to quickly and cleanly cut through a tubular conduit of synthetic resin.

A further object of the invention is to provide a conduit cutting device which can be supported on the floor and operated by hand, and which can be used to cut through conduits of various diametric sizes.

A further object of the invention is to provide a floor or bench mounted conduit cutting device which has a minimum of moving parts, each sturdily interconnected for reliability during operation, and which device is characterized in having a long and trouble-free operating life.

A further object of the invention is to provide a conduit cutting device which can be mounted upright on a floor or supporting structure and used to manually cut conduit quickly to a precisely measured length, or can be turned on its side, anchored by a foot plate, and used to cut conduit in a field location where no stationary securing and mounting structure is available.

Additional objects and advantages of the present invention will become apparent as the following detailed description of a preferred embodiment of the invention is read in conjunction with the accompanying drawings which illustrate such preferred embodiment.

GENERAL DESCRIPTION OF THE DRAWINGS

FIG. 3 is a view, partly in section and partly in elevation, showing the operating mechanism which undergoes movement during the operation of the conduit cutting device of the invention.

FIG. 4 is an end elevation view of the conduit cutting device shown in FIG. 1 as it appears when viewed from one end thereof.

FIG. 5 is a view in elevation, with the handle shown in section, of the conduit cutting device illustrated in FIG. 1, and showing the device as it appears when viewed from the opposite end thereof from that which is shown in FIG. 4.

FIG. 6 is a detail view illustrating the manner in which a spring device is employed for causing the operating handle of the device to return to its starting or initial position after it has been pivoted downwardly for purposes of cutting through a conduit using the conduit cutting device of the invention.

FIG. 7 is a view similar to FIG. 8, but having the pair of conduit retaining jaws illustrated in FIG. 8 removed.

FIG. 8 is a sectional view taken along line 8—8 of FIG. 1.

FIG. 9 is a sectional view taken along line 9—9 of FIG. 1.

FIG. 10 is a front elevation view of a modified embodiment of the invention with a portion of the handle shown broken away, and showing the conduit cutting device in one of its operating positions.

FIG. 11 is a top plan view of the modified embodiment of the invention illustrated in FIG. 10.

FIG. 12 is a sectional view taken along line 12—12 of FIG. 11.

FIG. 13 is a side elevation view of the modified embodiment of the invention illustrated in FIG. 10.

FIG. 14 is a different side elevation view of the modified embodiment of the invention illustrated in FIG. 10, as the conduit cutter appears when viewed from the opposite side thereof from that which is shown in FIG. 13, and showing the handle in section.

DETAILED DESCRIPTION OF A PREFERRED EMBODIMENT OF THE INVENTION

Figure 1:
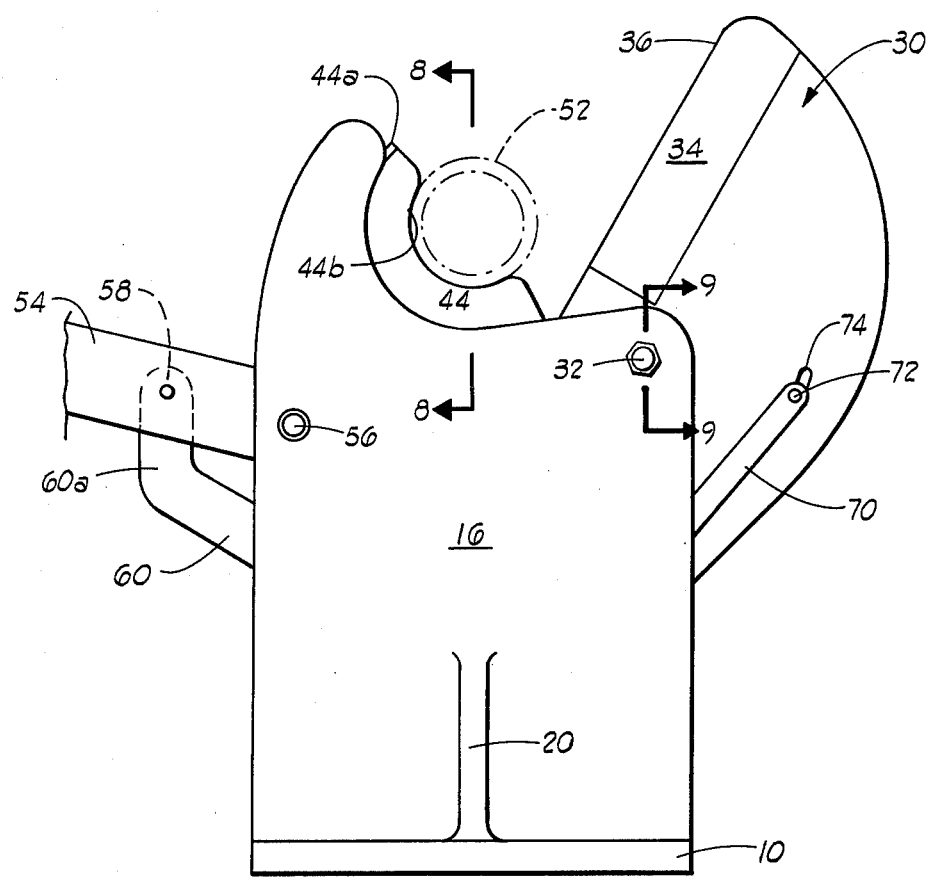
FIG. 1 is a side elevation view of a conduit cutting device constructed in accordance with the present invention.

Referring initially to the drawings, and particularly to FIG. 1, the conduit cutting device of the invention includes a base 10 constituted, in the illustrated embodiment of the invention, by a flat, substantially rectangular plate. The base 10 is provided with apertures 12 in several locations to facilitate bolting the base to the floor or other supporting platform. Projecting upwardly from the base are a pair of side plates 14 and 16 which are rigidly supported by web flanges 18 and 20 (see FIGS. 2 and 4). As will be noted in FIG. 4, the side plates 14 and 16 are separated by a vertically extending slot 22 at their upper ends and further, as shown in FIGS. 4 and 5, define a cavity or chamber 24, hereinafter referred to as a mechanism chamber, spacing the side plates at their lower end portions. The side plates are joined by interconnecting web portions 26 and 28 disposed adjacent the base 10 and the upper side of the side plates 14 and 16 at a location opposite the slot 22, respectively, as best illustrated in FIGS. 3 and 5. A blade element, designated generally by reference numeral 30, is pivotally supported between the side plates 14 and 16 by means of a pivot pin 32 which extends through a central portion of the blade element. As shown in FIG. 9, a counterbore 33 is formed in the side plate 14 and receives a compression spring 35 which bears at one end against the blade element 30 to frictionally retain the blade element at a location to which it is advanced during the conduit cutting operation as hereinafter described. The blade element 30 includes a tapered portion 34 which terminates in a straight cutting edge 36 along one side of the blade element, and further includes a serrated arcuate edge surface which has a plurality of ratchet teeth 38 formed thereon (see FIG. 3). The blade element 30 is positioned between the side plates 14 and 16 for pivotation in the slot 22, and the lower portion of the blade element projects downwardly into the mechanism chamber 24, as best illustrated in FIGS. 3 and 5.

At the upper side of the two side plates 14 and 16, the side plates are recessed to provide a pair of oppositely facing jaw element cavities 40 and 42. The jaw element cavities 40 and 42 cooperatively receive a pair of jaw elements 44. Each jaw element is of arcuate configuration and includes a flange element 44a which projects into one of the respective jaw element cavities 40 and 42 as shown in FIG. 8. When in place, the two jaw elements 44 define between them a slot 50. Also, on the arcuate or concave inner side of each of the jaw elements 44, a surface of semicircular configuration is located and is dimensioned for receiving, in the manner shown in FIG. 3 in dashed lines, a tubular conduit or pipe 52 which is to be cut through in a direction transverse with respect to the longitudinal axis thereof.

As will be hereinafter explained in greater detail, the jaw elements 44 can be relatively easily inserted in and removed from the respective jaw element cavities 40 and 42 and, in a preferred embodiment of the invention, a series of interchangeable jaw elements are provided which have their concave inner surfaces dimensioned for the reception of the pipe or conduit to be cut through. These sets of jaw elements are of various sizes at their concave inner peripheries to permit the accommodation and holding of conduits of various diametric sizes. In each case, the semi-circular configuration of the concave inner sides of the paired jaw elements will precisely register with the external periphery of the pipe or conduit to be cut through so that it is fully supported during the cutting operation.

Figure 2:
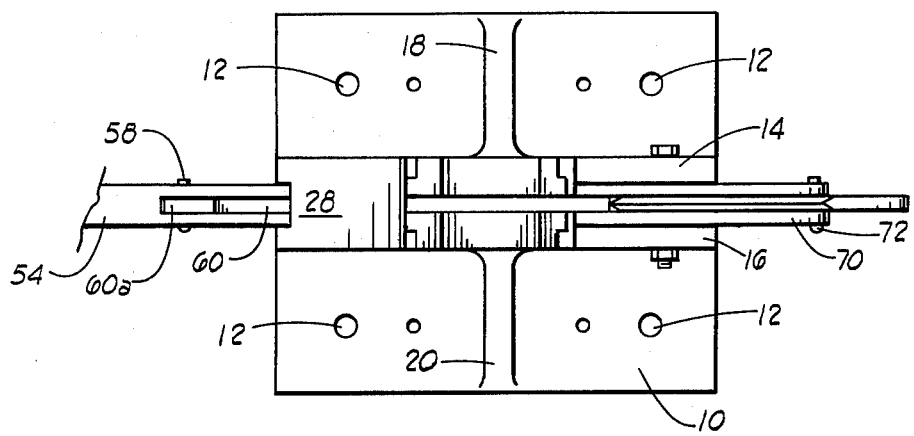
FIG. 2 is a plan view of the conduit cutting device shown in FIG. 1.

On the opposite side of the side plates 14 and 16 from the location where the pivot pin 32 supports the blade element 30 between the side plates, an elongated operating handle 54 has one of its ends pivotally connected between the side plates in the manner best illustrated in FIGS. 1 and 3. The end portion of the operating handle 54 which is pivotally connected between the side plates 14 and 16 is bifurcated so as to provide a slot between opposed side portions thereof. Projecting into this slot is an end portion of a pawl lever 60 and, as illustrated in FIGS. 2, 3 and 5, the pawl lever is here pivotally connected to the operating handle 54 by pivot pin 58.

The pawl lever 60 is generally U-shaped in configuration, having an upturned toe portion 60a at that end thereof which is pivotally connected to the operating handle 54 and having an upwardly turned dog 60b at the other end thereof. The dog 60b of the pawl lever 60 tapers to a pointed end to facilitate engagement with the ratchet teeth 38 carried on the blade element 30. For the purpose of restoring the operating handle 54 and the pawl lever 60 connected thereto to its initial position (as shown in full lines in FIG. 3) after the operating handle has been pivoted downwardly to the dashed line position shown in that Figure, a return spring 62 is connected in any suitable way between the operating handle and pawl lever to effect such restorative movement. In the illustrated embodiment, the return spring 62 is a helical tension spring having one end connected over a pin 64 carried on the operating handle 54 and the other connected in any suitable way to the pawl lever 60.

The inner end of the pawl lever 60 or, stated differently, that end which is displaced distally from the end 60a of the pawl lever is located within the mechanism chamber 24. The end portion of the pawl lever 60 which is adjacent the dog 60b has pivotally connected thereto through a suitable pivot pin 68, a pair of elongated substantially parallel indexing links 70. The two indexing links 70 extend on opposite sides of the blade element 30, and have their ends opposite the pivot pin 68 interconnected by a suitable pin 72. The pin 72 extends through an arcuate slot 74 formed in the blade element 30. The arcuate slot 74 is positioned and is configured so that the indexing links 70 are guided in such a way that the dog 60b carried on the end of the pawl lever 60 is guided in its up and down movements so that it will engage successive ones of the ratchet teeth 38 during each successive downward stroke of the operating handle 54. These movements will be better understood from the following detailed description of the operation of the invention.

OPERATION

In the operation of the floor mounted conduit cutting device of the invention, the device is first securely mounted on a stable surface such as a floor. In this regard, the base 10 can be bolted or otherwise suitably secured to the floor to assure adequate stability in the apparatus. A pair of jaw elements 44 is next selected for positioning in the jaw element cavities 40 and 42, according to the diametric size of the synthetic resin tubular conduit or pipe which is to be cut using the device of the invention. As previously explained, the arcuate inner peripheral edges of the jaw elements 44 are configured to mate with various diametrically sized conduits, so that complete support is given to the tubular element or conduit over approximately one-half of its entire periphery when it is placed in the jaw elements in the position illustrated in FIGS. 1 and 3.

With the selected jaw elements 44 pressed into the jaw element cavities 40 and 42, the cutting operation is then commenced. In undertaking the cutting of the conduit, the operating handle 54 is grasped by its outer end (not shown), and is pivoted downwardly about the pivot pin 56. This causes the pawl lever 60 to undergo movement from a position typified by that shown in full lines in FIG. 3 to that position which is illustrated in FIG. 3 by dashed lines. In undergoing this movement, the dog 60b engages one of the ratchet teeth 38 and causes the blade element 30 to pivot about the pivot pin 32. Such pivotal movement of the blade element 30 advances the straight cutting edge 36 toward the conduit 52. The compression spring 35 mounted around the pivot pin 32 exerts a sufficient frictional force on the side of the blade element 30 that it is retained in its advanced position at the end of the stroke of the operating handle 54, and does not fall downwardly to its initial position.

As the operating handle 54 is retracted from its dashed line position of FIG. 3 to the full line position shown therein, the pawl lever 60 is also retracted so that the dog 60b moves downwardly and to the left as viewed in FIG. 3. Upon recommencement of the downward stroke of the operating handle 54, the indexing links 70 assure that the dog 60b will be guided upwardly and into the next succeeding ratchet tooth 38 to effect a further incremental pivotal movement of the blade element 30.

The described operation of the operating handle 54 is repeated a number of times until the straight cutting edge 36 is caused to shear through the tubular conduit 52. In this regard, it will be noted that the jaw elements 44 are spaced from each other so that the cutting edge 36 can pass completely through the tubular conduit 52. After the conduit has been severed by the cutting action of the blade element 30, the blade element can be pivoted back to its open position preparatory to another cutting operation. This is effected by lifting up on the operating handle 54 to move it to a position well above the solid line position in FIG. 3. This movement will in turn cause the indexing links 70 and pin 72 to pull the blade element 30 through a pivotal movement back to its starting position.

A modified embodiment of the conduit cutter apparatus of the invention is illustrated in FIGS. 10–17 of the drawings. As this embodiment of the invention is illustrated in FIGS. 10–17, it includes a two-part housing 80 made up of two side casting subassemblies 82 and 84 which are bolted together by means of bolts 86, 87 and 88. Each of the side plate casting subassemblies 82 and 84 includes a vertically extending side plate 90 having a base flange 92 projecting normal to the lower end thereof. A gusset web 94 extends between each of the side plates 90 and the respective base flange 92 which extends therefrom. Base flanges 92 project in opposite directions to form a supporting base for the cutter apparatus.

Each of the side plate casting subassemblies 82 and 84 further includes a horizontally extending, downwardly opening receiving channel 96 for receiving a measuring element used conjunctively with the cutter apparatus as hereinafter described. It will be noted in referring to FIGS. 10–14 that the horizontally extending, downwardly opening receiving channels 96 are each arcuately shaped to provide an opening in the bottom plane of each of the base flanges 92, and that the receiving channels are horizontally aligned when the two side plate casting subassemblies 82 and 84 are bolted to each other. It will be further noted in referring to FIGS. 12 and 14 that bosses 97 are formed on the facing sides of each of the two side plates 90, and in alignment with each other, for the purpose of receiving the bolts 86 and 87 therethrough, and also to retain the side casting subassemblies 82 and 84 in proper spatial relationship to each other. The downwardly opening receiving channels 96 are similarly formed to project in alignment with each other when the side plate subassemblies 82 and 84 are abutted. Finally, each of the side plates 90 includes a laterally projecting boss portion 89, and these boss portions are in alignment with each other and are abutted at the time that the side casting subassemblies 82 and 84 are bolted together for purposes of operating the conduit cutter apparatus.

It will be noted in referring to FIGS. 10 and 11 that each of the base flanges 92 carries a pair of horizontally spaced, inwardly projecting U-shaped recesses 102 adjacent the laterally outer edges. The recesses 102 are provided to facilitate screwing or bolting the cutting apparatus to a table or the like, and also for the accommodation of locking bolts which are employed during the mode of operation in which the apparatus is extended horizontally along the floor in the manner hereinafter described. For the purpose of enabling a measuring element to be retained in a selected position within the downwardly opening receiving channels 96, a pair of wing nuts 104 are threaded through threaded apertures formed in the crest of each of the downwardly opening receiving channels 96 as shown in FIGS. 10 and 11.

At a time when the side casting subassemblies 82 and 84 are bolted together in their assembled relationship as shown in FIGS. 10 and 11, they define between them a space 105 as shown in FIGS. 13 and 14. The space 105 accommodates the operating mechanism of the embodiment of the conduit cutter apparatus shown in FIGS. 10–17. Such operating mechanism includes an elongated pawl lever 106 having an upturned toe portion 106a at an outer end thereof and located within the hollowed out interior of cross-sectionally U-shaped central portion 144a of arm 144. A large, plate-type blade element 108 is pivotally supported upon a pivot shaft 110 between a pair of protuberant lugs 90a which project from the two side plates 90. The blade element 108 is spring loaded by a compression spring (not shown) in the manner hereinbefore described.

The blade element 108 utilized in the embodiment of the invention illustrated in FIGS. 10-17 is similar to that depicted in the embodiment of the invention hereinbefore described and illustrated in FIGS. 1-9. The blade element 108, however, includes a plurality of ratchet teeth 114 which extend around a major portion of its peripheral edge and cover about 190° of a circumference of a circle upon which the ratchet teeth are formed. The blade element 108 further includes a tapered portion 116 which terminates in a straight cutting edge 118. A pair of overlapping arcuate slots 120 and 122 are formed through the blade element 108 at a location between the pivot shaft 110 and the ratchet teeth 114 and are concentric to each other and the pivot shaft. The slots 120 and 122 extend collectively over an arc of about 180° but are arranged for individual, independent use in alternate modes of operation of the conduit cutter apparatus as hereinafter described.

A pair of parallel indexing links 128 and 130 are interconnected at one end by a pivot pin 132 which extends through a slot 134 formed at the base of the upwardly turned dog 106b. The length of the slot 134 is such that the pivot pin 132 can move slidably within the slot over a short distance. At their ends opposite the ends connected by the pivot pin 132, the indexing links 128 and 130 are interconnected by a connecting pin 136 which extends between the ends of the links and through a selected one of the arcuate slots 120 and 122. In the operational mode of the cutter shown in FIGS. 10-14, the connecting pin 136 is shown extending through the arcuate slot 120. It will be noted in referring to FIG. 12 that each of the indexing links 128 and 130 defines a small aperture 138 spaced inwardly in the link from the location of the connecting pin 132, and also defines an alternate aperture 135 spaced along the respective link from the apertures which receive the pivot pin 134 in the mode of assembly illustrated in FIG. 12. The apertures 135 and 138 function as an alternate site for extension of the pivot pin 134 and connecting pin 136, respectively, through the two indexing links at a time when the apparatus is used in the mode illustrated in FIGS. 15-17 as hereinafter described.

For the purpose of actuating the blade element 108 to cut through a conduit supported in arcuate recesses 140 formed in each of the side plates 90, a handle subassembly 142 is provided. The handle subassembly 142 includes an arm 144 of substantially rectangular cross-section. The arm 144 has a cross-sectionally U-shaped central portion 144a which is hollowed out to facilitate the reception of the upturned toe portion 106a of the pawl lever 106. The upturned toe portion 106a is connected to the arm 144 of the handle assembly by a pivot pin 146 projected through the two opposed side portions of the arm 144. A second pivot pin 147 secures an inner end of the arm 144 between the side plates 90.

A spring 148 is turned about the pivot pin 146 and one end of the spring is inserted under and bears against a stop pin 150 passed through the arm 144. The other end of the spring hooks beneath the lower edge of the pawl lever 106 in the manner shown in FIG. 10. It will be noted in referring to FIG. 10 that at a point spaced along the pawl lever 106 from the end thereof at which the upturned toe portion 106a is located, the pawl lever has an aperture 152 formed therethrough for a purpose hereinafter described. It will also be noted that the arm 144 of the handle assembly 142 has an alternate aperture 151 formed therethrough. The use of this alternate aperture will be hereinafter explained.

At the end of the arm 144 opposite its end which is secured between the side plates 90 by the use of the pivot pin 147, the arm is solid, as contrasted with hollowed or bifurcated, and carries a transversely extending latching key 160 which projects from the opposite sides of the arm. One of the projecting ends of the latching key 160 can be seen in FIG. 10. A generally cylindrical or tubular handle extension 162 is engaged with the arm 144. In connecting the extension to the arm, the solid end of the arm is inserted into an open end of the handle extension 162, passing the latching key 160 along axially extending portions of L-shaped slots 164 formed in the opposite sides of the tubular handle extension. The handle extension is then rotated to cause the projecting ends of the transversely extending latching key 160 to move into the circumferentially extending portions of the pair of L-shaped slots 164 located on opposite sides of the handle extension.

As will be hereinafter explained in detail, the embodiment of the invention depicted in FIGS. 10-17 is susceptible of use in a selected one of two different ways of operation. In the upright position, illustrated in FIGS. 10-14, the base flanges 92 are placed in flatly abutting contact with a work table or other supporting structure, and are secured in this position by means of bolts or other suitable hold-down devices extended through the inwardly projecting U-shaped recesses 102 and through the tabletop or other supporting surface. A conduit is then placed in a position to be cut through by the blade element 108. This position is within concavities 140 which are formed in the upper sides of each of the vertically extending side plates 90. Cutting through the conduit is then effected by downward reciprocation of the handle subassembly 142 in a series of strokes as hereinafter explained in greater detail.

In order to permit the conduit which is to be cut with the cutter device in the manner described to be measured to a precise and selected length, a measuring device 170 is extended through the horizontally extending, downwardly opening receiving channels 96 formed in each of the base flanges 92 so that an end portion of the measuring device projects laterally from at least one of the base flanges, and extends normal to the line of travel of the blade element 108 through the conduit. The measuring device 170 will generally have, as a portion thereof, a conduit stop plate 172 which projects normal to an elongated scale-carrying portion 174 of the device. In the use of the measuring device 170, one end of the conduit to be cut is abutted against the conduit stop plate 172.

To obtain an accurate reading of the scale carried on the graduated portion 174 of the measuring device 170, a blade stop shaft 180 is extended between the side plates 90 at a location where the side plates are spaced near their upper ends to facilitate passage of the cutting edge 118 of the blade between the side plates. The blade stop shaft 180 carries a hairline-type index marker 182. The measuring device 170 can then be shifted in the channels 96 until the desired length of conduit to be cut is seen as corresponding to the appropriate indicia on the scale-carrying portion which is aligned with the index marker 182.

For the purpose of using the embodiment of the invention illustrated in FIGS. 10-16 in the alternate mode of utilization, a foot plate subassembly 186 is provided. The foot plate subassembly 186 includes a flat, horizontally extending base plate 188 which is provided adjacent one edge thereof with a pair of bolt holes 190 and 192. Projecting upwardly from, and normal to, the base plate 188 at the edge thereof which is adjacent the bolt holes 190 and 192 is an abutment plate 194 which extends transversely across the width of the base plate. A pair of triangular reinforcing plates 196 and 198 are placed at the corners of the foot plate subassembly 186 to impart enhanced structural strength to the abutment plate 194.

Figure 15:
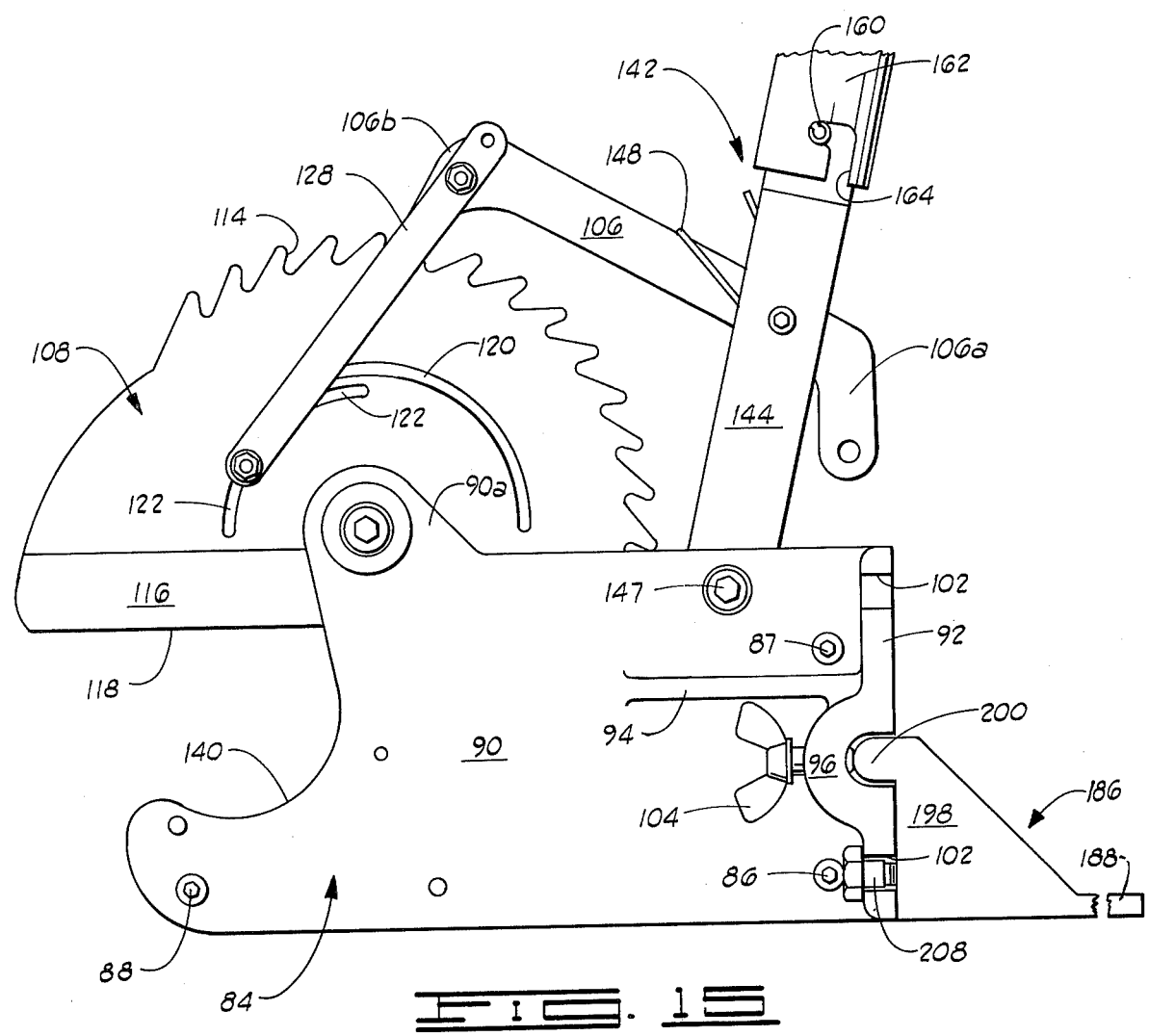
FIG. 15 is a side elevation view of the modified embodiment of the conduit cutter, showing it disposed in a second operating position. A part of the foot plate is illustrated as broken away.
Figure 17:
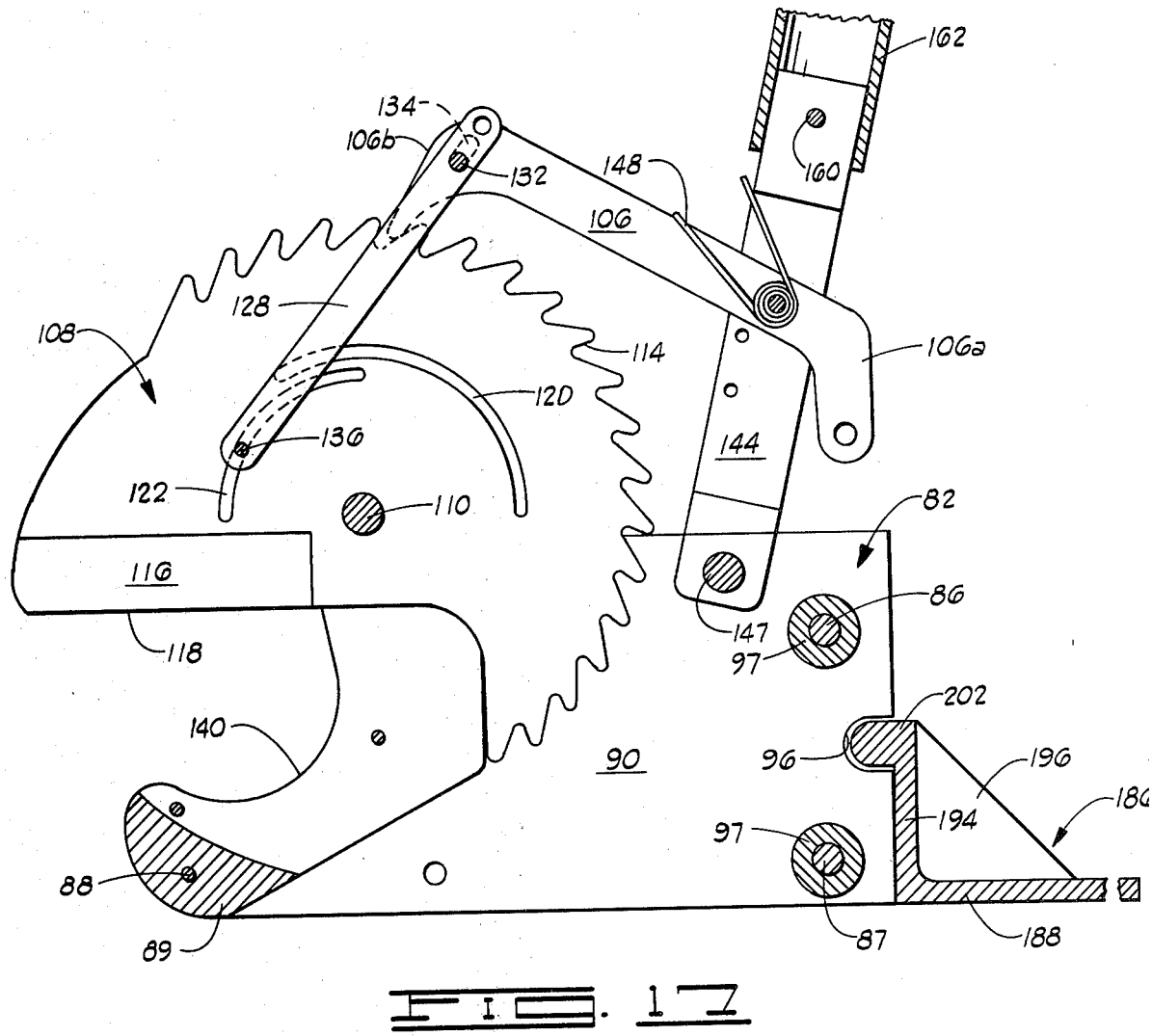
FIG. 17 is a sectional view taken along line 17—17 of FIG. 16.

Adjacent the upper edge and at opposite ends of the transversely extending abutment plate 194, a pair of locking bosses 200 and 202 project normal to the plane of the abutment plate and outwardly therefrom on the side of the abutment plate which is opposite the side at which the base plate 188 is located. The position of the locking bosses 200 and 202 is such that when the base plate 188 is placed flat on the upper surface of a table or other supporting structure, and the conduit cutter is turned on its side so that the straight side edges of the side plates 90 also flatly abut such surface, the abutment bosses 200 and 202 will project into, and register with, the horizontally extending, downwardly opening receiving channels 96 formed in the two base flanges 92. This relationship is best illustrated in FIGS. 15 and 17.

In order to provide for further interlocking of the base flanges 92 of the conduit cutter with the foot plate subassembly 186, the abutment plate 194 has a pair of threaded bolt openings 206 formed therein in a position of alignment with the inwardly projecting U-shaped recesses 102 formed adjacent one edge of each of the base flanges 92. This facilitates the extension of bolts 208 having threaded shanks into the threaded bolt openings thus provided, with the heads of the bolts drawing the base flanges 92 tightly against the abutment plate 194 in the manner best illustrated in FIGS. 15 and 16.

In the utilization of the embodiment of the invention illustrated in FIGS. 10-17, one mode of usage contemplates the placement of the conduit cutter device in an upright position in which the base flanges 92 flatly abut a supporting structure such as a table. Generally it will be desirable to bolt the structure to the table by placing the retention bolts in the inwardly projecting U-shaped recesses 102 and tightening them down.

With the conduit cutter thus stabilized and anchored, the measuring device 170 may then be placed in position for utilization if desired. Where the measuring device 170 is to be used, the elongated scale carrying portion 174 thereof is passed through the aligned downwardly opening receiving channels 96 so that the scale carrying portion rests on the top of the table, and extends through the aligned receiving channels. The scale carrying portion 174 is then slid along the top of the table until the distance which separates the conduit stop plate 172 and the plane in which the blade element 108 will move in cutting through a conduit is that which is indicated by a selected length measuring indicia carried on the scale carrying portion then in vertical alignment with the index marker 182 carried on the blade stop shaft 180. This is ascertained by visual sighting from above the structure to obtain visual alignment of the index marker 182 with the appropriate indicia forming a part of the scale on the scale carrying portion 172 of the measuring device 170. It will be understood that other forms of length measurement of the conduit using the conduit stop plate 172 as the zero bench mark can also be employed.

With the measuring device 172 thus positioned, the wing nuts 104 are tightened down to assure that the measuring device will be retained in the proper position. After this, the conduit which is to be cut into a selected length in those instances where the measuring device 170 is being utilized will be placed in the concavities 140 formed in the upper side edges of the side plates 90. In most instances, the conduit stop plate 172 will have a suitable flange 173 or the like which will aid in holding the conduit in this position by supporting the free end of the conduit which is abutted against the conduit stop plate.

With the conduit so positioned and ready for cutting, and with the mechanism interconnected as illustrated in FIGS. 10-14, the handle subassembly 142 is next actuated by pushing down upon the tubular handle extension 162. The handle extension 162 has previously been interlocked with the arm 144 in the manner hereinbefore described. As the handle extension 162 is pivoted downwardly about the pivot pin 147, the elongated pawl lever 106 is caused to move toward the right as the pawl lever is viewed in FIG. 12. This movement, in conjunction with the guiding function afforded by the connection of the pawl lever 106 to the indexing links 128 and 130, causes the upwardly turned dog 106b of the pawl lever to enter the space between two of the ratchet teeth 114.

Continued downward movement of the handle subassembly 142 causes the dog 106b of the pawl lever 106 to push against the ratchet teeth 114 to cause the blade element 108 to undergo an increment of rotation about the pivot shaft 110. This increment of rotation is completed upon the completion of the downward pivotal stroke of the handle subassembly 142. The handle subassembly 142 is then raised up again to about the position illustrated in FIGS. 10 and 12, or slightly higher, to retract the dog 106b from the ratchet teeth 114. At this time, the dog 106b is guided by the action of the indexing links 128 and 130 to a position where it is aligned with the next adjacent opening between the next adjacent pair of ratchet teeth 114. Upon the next downward stroke of the handle subassembly 142, the previously described action is repeated, except that the dog 106b enters the opening between the next adjacent pair of ratchet teeth, and then pushes the blade element 108 through a further increment of rotation.

Over a series of strokes of the handle subassembly 142 of the the type described, the blade element 108 is advanced through an accumulative series of increments of rotation so that the cutting edge 118 of the blade element is ultimately brought into contact with the outer periphery of the conduit resting in the concavities 140 formed in the upper side edges of the side plates 90. After this, several additional strokes of the handle subassembly 142 are carried out to cause the cutting edge 118 of the blade element 108 to be advanced through the conduit to shear it along a diametric plane. Ultimately, the conduit is sheared completely through, and the stop shaft 180 assures that no further advance of the blade will occur.

At this time, the tubular handle extension 162 is lifted upwardly to a position such that the handle subassembly 142 extends upwardly at a substantial angle from the substantially horizontal position illustrated in FIGS. 10 and 12. This action will cause the pawl lever 106 to be pulled toward the left as it is viewed in FIG. 12, carrying with it the indexing links 128 and 130 which, at this time, are located so that the connecting pin 136 is very close to the trailing end of the slot 120. Retraction of the indexing links toward the left will therefore cause the blade element 108 to be reversed in its direction of rotation and pulled back to substantially its starting position.

Figure 16:
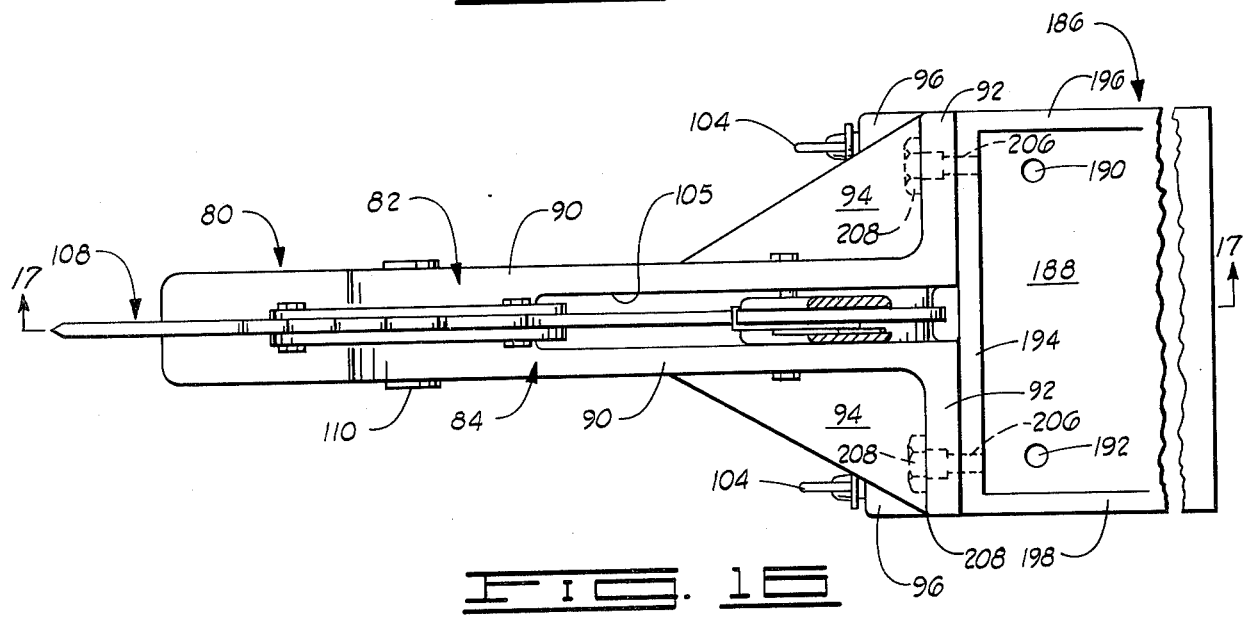
FIG. 16 is a top plan view of the modified embodiment positioned in the second operating position.

The conduit cutter device embodiment illustrated in FIGS. 10-14 can be easily converted for use in the mode illustrated in FIGS. 15-17. In this manner of usage, the two-part housing 80 is turned over on its side so that it rests upon the straight side edges of the side plates 90 and upon the coplanar aligned edges of the base flanges 92. The pivot pin 147 is then removed to permit the arm 144 to be detached from the housing 80, and the tubular handle extension 162 is also disconnected from the arm by rotation of the handle extension to permit the latching key 160 to be slid outwardly through the axially extending portions of the L-shaped slots 164.

When these detachments have been effected, the arm 144 is then manipulated to push the pawl lever 106 and the indexing links 128 and 130 connected thereto to the right through the space 105 between the vertically extending side plates 90 until the point of connection of the indexing links to the pawl lever is exposed on the right side of the housing 80 as it is viewed in FIG. 10. At this time the pawl lever can be disconnected from the two indexing links 128 and 130 by removal of the pivot pin 132. The pawl lever can then be withdrawn by pulling it out of the space 105 and to the left of the housing 80. The arm 144 of the handle subassembly 142 is then reconnected by extending the pivot pin 147 through the openings 91 provided through the side plates 90 on the right side of the housing 80 as it is viewed in FIG. 10 or, when the housing is turned on its side, near the top side of the housing as viewed in FIG. 15. The arm 144 is then connected to the pawl lever 106 by extension of the pivot pin 146 through the alternate aperture 151 provided in the arm 144 and through the aperture 152 provided through the pawl lever 106 at a point spaced downwardly along the lever from the upturned toe portion 106a. In this arrangement, the spring 148 is relocated to extend between the pawl lever and the solid portion of the arm 144 in the manner shown in FIGS. 15 and 17. The upwardly turned dog 106b of the pawl lever 106 is then connected to the indexing links 128 and 130 (after they have been disconnected from the blade by removal of the pin 136) by extension of the pivot pin 132 through the alternate apertures 135 in each of the two indexing links and through the slots 134 formed in the dog. Finally, the connecting pin 136 is re-extended through the outer ends of the two indexing links 128 and 130 and through the slot 122 formed in the blade element 108.

With the conduit cutter device arranged in the described manner, the last step preparatory to using the device is to secure the foot plate subassembly 182 thereto. This is accomplished by initially placing the foot plate subassembly 186 immediately adjacent the base flanges 92 of the two-part housing 80 so that the locking bosses 200 and 202 project into the two horizontally extending, downwardly opening receiving channels 96 formed in each of the base flanges 92. At this time, the wing nuts 104 are substantially retracted so that mating registration of the boss 202 with the channels 96 can be effected. Finally, the bolts 208 are fitted into the threaded bolt openings 206 formed in the abutment plate 194 with the heads of the bolts bearing against the upper surfaces of the base flanges 92, and the shanks of the bolts passing through the inwardly projecting U-shaped recesses 102 in the manner illustrated in FIG. 15.

With the conduit cutter apparatus thus assembled, relatively large diameter conduit can be cut through by laying it in the concavities 140 formed in the upper side edges of the side plates 90 of the two-part housing 80. The operator then stands on the base plate 188 of the foot plate subassembly 186 to hold the apparatus stationary, and at this time manipulates the tubular handle extension 168 in a pivotal movement to actuate the blade element 108 in a series of incremental pivotal movements. The blade element is again caused to contact and shear through the conduit in the manner hereinbefore described. Alternately, the base plate 188 of the foot plate subassembly 186 can be bolted to the supporting structure by extending bolts through the bolt holes 190 and 192.

Although certain preferred embodiments of the invention have been herein described in order to illustrate the basic principles which underlie the invention, it will be understood that various changes of structure can be made in the apparatus without departure from such basic principles or alteration of the general mode of operation of the structure. Changes and alterations of this type are therefore deemed to be circumscribed by the spirit and scope of the invention except as the same may be necessarily limited by the appended claims or reasonable equivalents thereof.

What is claimed is:

1. A conduit cutting device comprising:
a base;
a housing having a side and secured to and projecting upwardly from said base, said housing comprising:
  a pair of opposed, substantially parallel vertically extending side plates separated by a vertically extending slot between the upper portions of the side plates, and defining a mechanism chamber between the lower portions of the side plates; and
  means interconnecting the side plates; a blade element pivotally supported between the side plates movable in said slot, said blade including:
  a plurality of ratchet teeth along a first side of said blade element;
a cutting edge along another side of said blade element spaced from said first side; and
a slot through the blade element;
an operating handle pivotally connected to the housing at a location spaced from the pivotal axis of the blade element;
an operating mechanism interconnecting the operating handle with the blade element to pivot the blade element about its axis when said operating handle is pivoted about its pivotal axis, said operating mechanism including:
  means for engaging said ratchet teeth in consecutive sequence upon repetitive pivotation of said operating handle; and
  indexing means connected between said engaging means and the slot in said blade element for alternately guiding said engaging means to a position of engagement between two adjacent ratchet teeth upon pivotation of said operating handle in one direction, and then guiding said engaging means to a position of alignment with a different pair of adjacent ratchet teeth upon pivotation of said operating handle in a direction opposite said one direction of pivotation thereof; and means on said side plates for supporting a tubular conduit in a position to be cut through transversely by the cutting edge of said blade element when said blade is pivoted in one direction about its pivotal axis.

2. A conduit cutting device as defined in claim 1 wherein said engaging means comprises an elongated pawl lever having
 a first end connected to said operating handle;
 a second end; and
 a dog formed on said lever at said second end.

3. A conduit cutting device as defined in claim 1 wherein said indexing means comprises a pair of substantially parallel indexing links each having one end pivotally connected to said engaging means and each having a second end operatively and movably connected to said slot for movement in a path following said slot.

4. A conduit cutting device as defined in claim 1 wherein each of said side plates is characterized in including a jaw element cavity, said jaw element cavities being aligned with each other; and
 wherein said means for supporting a tubular conduit comprises a pair of spaced, aligned conduit receiving jaws, each including
  a flange projecting into one of said cavities;
and
  an open concave inner surface.

5. A conduit cutting device as defined in claim 2 and further characterized as including spring means connected to said operating handle for resiliently urging said operating handle in said opposite direction of pivotation after manual pivotation of said operating handle in said one direction.

6. A conduit cutting device as defined in claim 5 wherein each of said side plates is characterized in including a jaw element receiving cavity, said jaw element receiving cavities being aligned with each other; and
 wherein said means for supporting a tubular conduit comprises a pair of spaced, aligned, conduit-receiving jaws each including
  a flange projecting into one of said cavities;
and
  an open concave inner surface.

7. A conduit cutting device as defined in claim 6 wherein said indexing means comprises:
 a pair of substantially parallel indexing links each having one end pivotally connected to said engaging means; and
 a pin interconnecting the other ends of said elongated, parallel, indexing links and extending through the slot in said blade element.

8. A conduit cutting device as claimed in claim 1 wherein said means on said side plates for supporting a tubular conduit comprises a pair of concave edges defining a part of the upper ends of the side plates.

9. A conduit cutting device as defined in claim 1 wherein said device further comprises:
 a second slot through said blade element and adapted for selective interconnected of said blade element with said operating handle through said operating mechanism; and
 means for selectively and alternately connecting said handle at two different locations to said housing, and in two different points of connection to said operating mechanism whereby said device can be operated in cutting conduit either when the device is supported upon the base or when the device is supported on a side of the housing.

10. A conduit cutting device as defined in claim 1 wherein said housing includes a pair of identical side casting subassemblies each including one of said side plates, and each further including bosses projecting from the respective side plate in alignment with the bosses on the other of the side plates.

11. A conduit cutting device as defined in claim 1 wherein said base includes a pair of base flanges formed integrally with said side plates and each defining a horizontally extending receiving channel.

12. A conduit cutting device as defined in claim 1 and further characterized as including a foot plate subassembly connected to said base and having a base plate aligned with said side of said housing.

13. A conduit cutting device as defined in claim 1 wherein said operating handle comprises:
 an arm having a first end pivotally connected to said housing and having a second end;
 a latching key carried on the second end of the arm;
 a handle extension detachably connected to the second end of the arm by means of said latching key; and
 means connecting a central portion of said arm to said operating mechanism.

14. A conduit cutting device as defined in claim 11 and further characterized as including a measuring device comprising:
 an elongated scale-carrying portion positioned in said receiving channels; and
 a conduit stop plate secured to and projecting normal to said scale-carrying portion.

15. A conduit cutting device as defined in claim 14 and further characterized as including means for retaining said measuring device at a selected position relative to the plane of cutting movement of said blade element.

16. A conduit cutting device as defined in claim 9 wherein said indexing means comprises:
 a pair of substantially parallel, elongated indexing links;
 means connecting one of the ends of each of said indexing links to said engaging means; and
 means for selectively and alternatively connecting the second ends of the indexing links to said blade element at a selected one of said slots through said blade element.

17. A conduit cutting device as defined in claim 16 wherein said means on said side plates for supporting a tubular conduit comprises a pair of concave edges defining a part of the upper ends of the sides plates.

18. A conduit cutting device as defined in claim 17 wherein said housing includes a pair of identical side casting subassemblies each including one of said side plates, and each further including bosses projecting from the respective side plate in alignment with the bosses on the other of the side plates.

19. A conduit cutting device as defined in claim 17 and further characterized as including a foot plate subassembly connected to said base and having a base plate aligned with said side of said housing.

20. A conduit cutting device as defined in claim 17 wherein said means for engaging said ratchet teeth comprises an elongated pawl lever having:
  a first end connected to said operating handle;
  a second end; and
  a dog formed on said lever at said second end.

21. A conduit cutting device as defined in claim 1 wherein said supporting means comprises a pair of arcuate recesses formed in the upper sides of said side plates.

22. A conduit cutting device as defined in claim 1 wherein said blade further includes a second slot therethrough, said first-mentioned and said second slot being arcuate in configuration;
  and wherein said cutting device further includes means on said housing for pivotally connecting said operating handle thereto at two alternate locations for pivotation about two spaced horizontal axes of pivotation to facilitate an alternate conduit cutting mode when said housing is placed on one side on a floor with said base extending vertically.

23. A conduit cutting device as defined in claim 22 wherein said base comprises a pair of coplanar base flanges each extending substantially normal to the plane of one of said side plates, and each defining a horizontally extending, downwardly opening receiving channel adapted for receiving a horizontally extending measuring element.

24. A conduit cutting device as defined in claim 23 and further characterized as including a hold-down subassembly including
  a horizontally extending tongue engageable with said receiving channels; and
  a friction plate extending substantially normal to the plane of said base flanges.

25. A conduit cutting device as defined in claim 1 wherein said operating handle comprises:
  an arm of substantially rectangular cross-section having one end pivotally connected between said side plates, and having a second end;
  a transversely extending latching key projecting from opposite sides of said arm at the second end thereof;
  and
  a tubular handle extension having a J-slot in one end thereof for receiving and engaging said latching key to operatively interlock said arm and said handle extension.

* * * * *